United States Patent Office 2,768,156
Patented Oct. 23, 1956

2,768,156

PROCESS FOR THE PRODUCTION OF POLYMERISATION PRODUCTS USING SULPHINIC ACID SALTS

Hellmut Bredereck and Erich Bäder, Stuttgart, Germany, assignors to W. C. Heraeus G. m. b. H., Hanau (Main), Germany, a corporation of Germany, and Deutsche Gold- und Silber-Scheideanstalt, vormals Roessler, Frankfurt am Main, Germany, a corporation of Germany No Drawing. Application March 4, 1952,
Serial No. 274,822

Claims priority, application Germany March 8, 1951

9 Claims. (Cl. 260—88.7)

This invention relates to a process for the production of polymerisation products.

Sulphinic acids have already been proposed as polymerisation catalysts, especially for the polymerisation of organic substances at relatively low temperatures. These substances often show a considerable effectiveness, but have the disadvantage that they are unstable. Inorganic salts of sulphinic acids, such as the sodium salts, are stable but have no substantial influence on polymerisation. It has now surprisingly been found that, unlike the inorganic salts of sulphinic acids, the salts of sulphinic acids with organic bases, especially with primary and secondary amines, show a high effectiveness in the polymerisation of unsaturated organic compounds and are also very stable.

According to the invention salts with organic bases of various aliphatic and aromatic sulphinic acids, for example isoamylsulphinic acid, benzenesulphinic acid, p-toluenesulphinic acid, are used as polymerisation accelerators. Thus for example use is made of salts of sulphinic acids with aliphatic amines, such as methylamine, diethylamine, dibutylamine, diisobutylamine, dihexylamine and trihexylamine, and aromatic amines such as aniline and p-toluidine, and also mixed aliphatic-aromatic amines. The organic bases used for the production of the sulphinic acid salts can themselves represent polymerisation catalysts effective in redox systems, or can also be inactive as such.

The preparation of salts of p-toluenesulphinic acid with aniline, o- and p-toluidine, m-xylidine and phenylhydrazine, has already been described (A. Hälssig, J. für praktische Chemie [2], vol. 56 (1897), page 218). For the preparation of the compounds to be employed according to the invention, generally the appropriate sulphinic acid is reacted in organic solvents with the appropriate nitrogen-containing base, whereupon the salts are precipitated. In many cases the following procedure can be adopted with advantage, this procedure being illustrated by way of example with reference to p-toluenesulphinic acid:

By reacting p-toluenesulphinic acid with an aldehyde the corresponding p-toluenesulphincarbinol is obtained. The latter is reacted with the appropriate secondary amine whereupon the corresponding amine salt of p-toluenesulphinic acid is formed with splitting off of the aldehyde.

As already mentioned the salts of sulphinic acids with organic bases are distinguished by an excellent stability as compared to the sulphinic acids themselves and also by a high catalytic effectiveness. Frequently this effectiveness is made use of in association with oxidation components which then form a redox system together with the salts of sulphinic acids with primary or secondary amines. For example the oxidation components employed may be substances such as inorganic per-compounds, such as hydrogen peroxide or potassium persulphate, or organic per-compounds, for example dibenzoyl peroxide or p-chlorbenzoyl peroxide, assuming that the access of oxygen or air does not by itself suffice.

The new catalysts can also be combined with other known polymerisation catalysts, i. e. also with other reduction components, in redox systems. It has proved particularly advantageous to use tertiary amines as reduction components in the redox system, for example aliphatic, aromatic or mixed aliphatic-aromatic tertiary amines, as well as derivatives of hydrazine. Moreover the catalysts recently discovered by one of the assignees have proved particularly advantageous for use in the process of the invention, namely arylalkyl-dialkyl amines, for exmple phenyl-ethyl-dibutyl amine, $$C_6H_5.CH_2.CH_2.N(C_4H_9)_2$$

and phenyl-butyl-dibutyl amine $$C_6H_5.CH_2.CH_2.CH_2.CH_2.N(C_4H_9)_2$$

and also catalysts which represent tertiary alkanolamines, such as the mono or di-ethanolamines containing alkyl groups, for example dibutyl-monoethanol amine and butyl-diethanolamine, and trialkanolamines, such as triethanolamine. Nitrogen-containing compounds can be used with good results, in which at least one hydrogen atom linked to the nitrogen atom is substituted by a residue of the general formula:

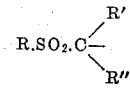

in which R represents a desired organic, especially aromatic residue, R' and R'' represent hydrogen, or a hydrocarbon residue which may if desired be substituted. We prefer especially secondary and tertiary amines containing residues of this kind, for example compounds such as:

$$(CH_3.C_6H_4SO_2.CH_2)_2NH$$

or $$(C_6H_{13}.SO_2.CH_2)_2NCH_3$$

which are obtained by mixing a sulphinic acid with formaldehyde and reacting the hydroxyl compound obtained with the appropriate amine.

The salts of sulphinic acids with organic bases are preferably used as polymerisation accelerators in the polymerisation of polymerisable organic compounds with a doubly linked terminal methylene groups, for example unsaturated hydrocarbons of aliphatic or aromatic nature, vinyl compounds, styrenes, allyl compounds, more especially acrylic acid and alkylacrylic acids, for example methacrylic acid, as well as derivatives thereof such as amides, nitriles, chlorides, ethers or esters, preferably methylmethacrylate.

The salts of sulphinic acids with organic bases can be employed, not only in block polymerisation, but also in solution polymerisation, emulsion polymerisation and suspension polymerisation. In the case of block polymerisation the new catalysts are employed with particular advantage in the process in which the monomeric liquid to be polymerised is mixed with the already completely polymerised product, present for example in powder form, and the polymerisation of the mass is then completed to give the finished moulded product.

The salts of sulphinic acids with organic bases are added in the most varied ways, adapted to the material to be polymerised and the purpose of use, for example are added to the total polymerisation material or are previously added only to the monomeric compound or to a solid component which is to be added or are added subsequently by themselves, whilst there are similar possible modes of adding the oxidation components.

The following examples illustrate the favourable accelerating effect of the new catalysts when polymerisation is carried out at low temperatures:

Examples 1.5 cc. of monomeric methylmethacrylate stabilised with hydroquinone and 2–3 gm. of polymeric methylmethacrylate, which contains 0.5–4% benzoyl peroxide and 50–100 mg. of polymerisation accelerator, are stirred together. The following polymerisation times were observed on use of the polymerisation accelerators set out below, beginning on one case at room temperature and in another case at 35° C.

| Polymerisation accelerator | $t_{Rt}$ | $t_{35}$ |
|---|---|---|
| $C_6H_5SO_2H.HN(C_6H_{13})_2$ | 14 | 6 |
| $C_6H_5SO_2H.H_2NC_6H_5$ | 26 | |
| $C_6H_5SO_2H.H_2NC_6H_4CH_3(p\text{-})$ | 20 | |
| $p\text{-}H_3CC_6H_4SO_2H.HN(C_2H_5)_2$ | 13 | 5 |
| $p\text{-}H_3CC_6H_4SO_2H.HN(C_4H_9)_2$ | 12–13 | 5–6 |
| $p\text{-}H_3CC_6H_4SO_2H.HN(C_6H_{13})_2$ | | 10–12 |
| $p\text{-}H_3CC_6H_4SO_2H.\text{piperidin}$ | 12 | 4–5 |
| $C_6H_5SO_2H.H_2NNHC_6H_5$ | 30 | |
| $p\text{-}H_3CC_6H_4SO_2H.H_2NNHC_6H_5$ | | 7–8 |
| $i\text{-}C_5H_{11}SO_2H.H\ NNHC_6H_5$ | 30–35 | |
| $n\text{-}C_8H_{17}.SO_2H.H_2NCH_2C_6H_5$ | 9–10 | |

$t_{Rt}$=polymerisation time in minutes beginning at room temperature.
$t_{35}$=polymerisation time in minutes beginning at 35° C.

The new catalysts and the polymerisation materials to be produced therewith can be employed in the most varied fields and for manifold purposes. Accordingly the most varied additional substances are added to the products prior to, during or after the polymerisation in manner known per se.

The polymerisation materials containing salts of sulphinic acids with organic bases can be used for example in the lacquer, adhesive and surface-coating industries, also for the production of masses to be applied by means of a spatula, impregnating masses for materials of all kinds, for example fabrics, especially textiles, joint packing masses, pore fillers, for the production of bodies or claddings which are to be resistant against chemical attack or atmospheric influences, for electrical insulators of all kinds, heat and sound insulating materials, modelling and imprint receiving masses. Moreover moulded bodies of various kinds may be produced varying from rubbery to glassy, for example also articles which must be optically clear or transparent, such as safety glass, protective filters and spectacle lenses.

Polymerisation catalysts containing salts of sulphinic acids with organic bases, especially primary or secondary amines, are of particular importance in the dental field, for example for the production of protheses, artificial teeth and tooth and root fillings. True-to-shape pieces are preferably produced by introducing the monomeric or only partially polymerised liquid into the mould in admixture with a preferably pulverulent polymer, especially one which corresponds to the compound to be polymerised, and completing the polymerisation in the mould to form the finished moulded article. The liquid and the powder component are preferably stored separately until polymerisation is carried out.

Because of the considerable shortening of the hardening time and the possibility of carrying out the polymerisation at relatively low temperatures, catalysts containing salts of sulphinic acids with organic bases are of particular importance for prosthetic work in the mouth itself and for tooth fillings.

The new catalysts can be used with advantage in other prothetic fields outside the dental field.

What we claim is:

1. In the process for the production of polymerisation products the improvement which comprises polymerising a polymerisable organic compound having a terminal methylene group double bonded to a carbon atom in the presence of a member selected from the group consisting of alkyl and aryl sulphinic acid organic amine salts as polymerisation accelerator, and recovering a polymerisation product.

2. Improvement according to claim 1 in which said polymerisable organic compound is a member selected from the group consisting of acrylic acid and alkyl acrylic acid.

3. Improvement according to claim 1 in which said polymerisable organic compound is a monomeric compound in mixture with a polymerised compound of such an organic compound.

4. Improvement according to claim 1 in which said salt is the salt of an organic primary amine.

5. Improvement according to claim 1 in which said salt is the salt of an organic secondary amine.

6. Improvement according to claim 1 in which said salt is the salt of a heterocyclic amine.

7. Improvement according to claim 1 in which said polymerisation is effected in the presence of an oxygen-containing polymerisation catalyst.

8. Improvement according to claim 1, in which said accelerator includes a tertiary amine present with said salt, thereby forming a redox system.

9. Improvement according to claim 1, in which said accelerator includes a sulphonamine present with said salt, thereby forming a redox system.

References Cited in the file of this patent

UNITED STATES PATENTS

| 2,434,054 | Roedel | Jan. 6, 1948 |
| 2,462,354 | Brubaker et al. | Feb. 22, 1949 |
| 2,519,135 | Jacobson et al. | Aug. 15, 1950 |
| 2,567,803 | Castan et al. | Sept. 11, 1951 |

FOREIGN PATENTS

| 883,679 | France | Mar. 29, 1943 |

OTHER REFERENCES

Halssig: J. prak. Chem., B. 164, n. F. 56, pages 213–241 (1897).